(12) United States Patent
Chang

(10) Patent No.: US 11,236,705 B2
(45) Date of Patent: Feb. 1, 2022

(54) GASEOUS FUEL MIXER ASSEMBLY FOR ENGINE AND ENGINE SYSTEM OPERATING METHOD

(71) Applicant: Caterpillar Inc., Peoria, IL (US)

(72) Inventor: David Yu Zhang Chang, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 34 days.

(21) Appl. No.: 16/912,300

(22) Filed: Jun. 25, 2020

(65) Prior Publication Data
US 2021/0404422 A1 Dec. 30, 2021

(51) Int. Cl.
| | |
|---|---|
| *F02M 21/04* | (2006.01) |
| *F02M 21/02* | (2006.01) |
| *B01F 3/02* | (2006.01) |
| *B01F 5/00* | (2006.01) |
| *F02M 35/10* | (2006.01) |
| *B01F 5/04* | (2006.01) |

(52) U.S. Cl.
CPC ............ *F02M 21/04* (2013.01); *B01F 3/028* (2013.01); *B01F 5/008* (2013.01); *B01F 5/0475* (2013.01); *F02M 21/0254* (2013.01); *F02M 21/0278* (2013.01); *F02M 35/10262* (2013.01); *F02M 21/0209* (2013.01)

(58) Field of Classification Search
None
See application file for complete search history.

(56) References Cited

U.S. PATENT DOCUMENTS

| | | | |
|---|---|---|---|
| 4,503,831 A | 3/1985 | Rijkeboer | |
| 4,614,202 A * | 9/1986 | Halvorsen | B23P 15/001 137/118.02 |
| 5,377,646 A * | 1/1995 | Chasteen | F02M 21/042 123/527 |
| 5,435,288 A * | 7/1995 | Schmal | F16K 11/065 123/527 |
| 5,692,478 A * | 12/1997 | Nogi | F02B 37/16 123/494 |
| 6,050,246 A | 4/2000 | Abdelmesih | |
| 9,562,497 B2 | 2/2017 | Coldren | |
| 2019/0178176 A1 | 6/2019 | Wirz et al. | |

FOREIGN PATENT DOCUMENTS

| | | | | |
|---|---|---|---|---|
| FR | 2491551 A1 * | 4/1982 | ......... | F02M 21/0239 |
| JP | 61058964 A * | 3/1986 | ........... | F02D 19/022 |

* cited by examiner

*Primary Examiner* — Michael A Kessler
(74) *Attorney, Agent, or Firm* — Brannon Sowers & Cracraft

(57) ABSTRACT

A gaseous fuel mixer assembly for an engine includes a mixer housing forming gas delivery openings, and positioned to extend across a flow path formed by an intake conduit for the engine. A spool valve is within a central bore in the mixer housing and includes gas distribution openings selectively connectable to the gas delivery openings by moving the spool valve within the mixer housing using a piezoelectric actuator coupled with the spool valve by way of a pivot arm. Sealing lands of the spool valve are in an alternating arrangement with the gas distribution openings, such that at the closed position the sealing lands block the gas distribution openings from the gas delivery openings, and at the open position the respective openings are fluidly connected.

20 Claims, 3 Drawing Sheets

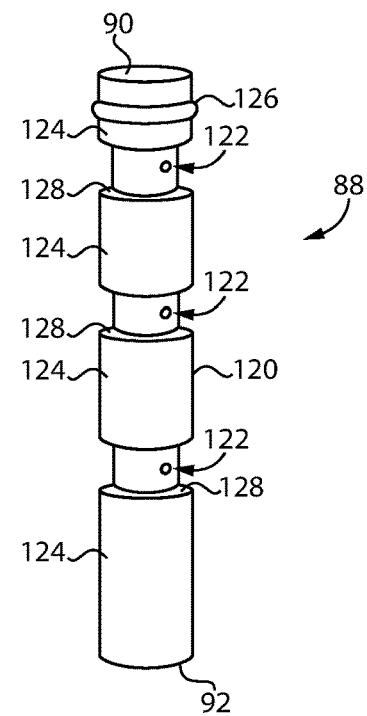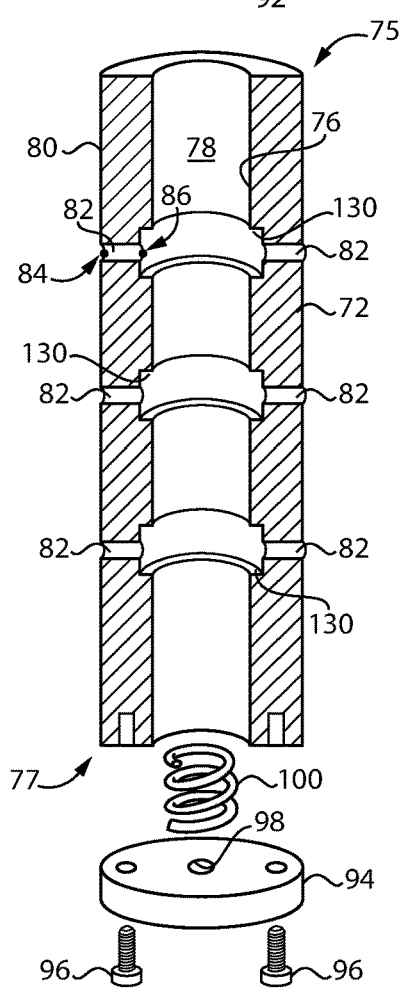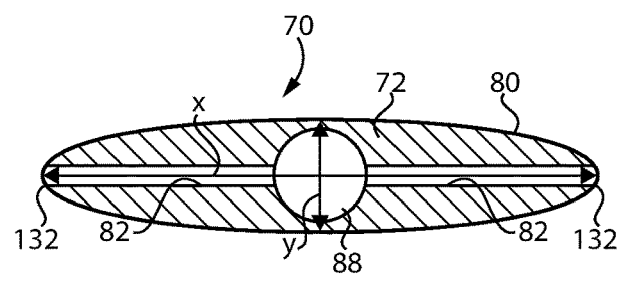
FIG. 3
FIG. 4

GASEOUS FUEL MIXER ASSEMBLY FOR ENGINE AND ENGINE SYSTEM OPERATING METHOD

TECHNICAL FIELD

The present disclosure relates generally to mixing gaseous fuel with intake air for delivery to an engine cylinder, and more particularly to a gaseous fuel mixer assembly positioned in a flow path of intake air and having gas delivery openings with a circumferential distribution and an axial distribution.

BACKGROUND

In recent years gaseous fuel engines have become widespread in many different applications. Electrical power generation, gas compression, pumping applications, locomotives, and all manner of on-highway and off-highway machines are known which utilize engines operating on natural gas or other gaseous fuels. Natural gas tends to be abundant and can sometimes be available from natural sources onsite. Moreover, gaseous fuel engines in general tend to produce smaller amounts of certain emissions. In a typical example, a gaseous fuel is introduced into an intake runner or an intake port of an engine where it begins to mix with incoming intake air to form a combustion charge that is fed into a cylinder in the engine. In other examples, gaseous fuel is fumigated into the intake system by delivery upstream a compressor in a turbocharger, which then supplies a compressed mixture of gaseous fuel and air downstream to the cylinders. In still other applications, gaseous fuel can be directly injected into a cylinder in the engine.

It has been common to utilize solenoid-operated admission valves for the gaseous fuel in these various applications. Solenoid-operated admission valves have been demonstrated to perform acceptably over the course of engine service intervals. Although effective, solenoid-operated admission valves can in some instances not have the speed and/or force required to open fast enough or against high turbocharger boost pressures to provide a desired level of control. Moreover, solenoid-operated admission valves can sometimes be associated with leakage due to boost pressure fluctuations and can be pushed open by the boost pressure in some instances. Additional challenges with solenoid-operated admission valves relate to complexity, cost, and valve-life issues. U.S. Pat. No. 9,562,497 to Coldren proposes an engine system having a piezo actuated gas injector. In the design set forth by Coldren the fuel injector has a body, a first piston slidingly disposed in the body and having a first pressure area, and a second slidable piston having a second pressure area. A piezoelectric actuator is provided for moving the first piston. While Coldren may perform well in many applications, there is always room for improvement and alternative strategies.

SUMMARY OF THE INVENTION

In one aspect, a gaseous fuel mixer assembly for an engine includes a mixer housing defining a longitudinal axis and including an inner housing surface forming a central bore, an outer housing surface, and gas delivery openings fluidly connected to the central bore and extending to the outer housing surface. The gas delivery openings form gas outlet locations having a circumferential distribution and an axial distribution in the outer housing surface, and gas inlet locations having an axial distribution in the inner housing surface. The mixer assembly further includes a spool valve within the central bore and including an inner valve surface forming a gas supply passage, an outer valve surface, gas delivery openings fluidly connected to the gas supply passage and extending to the outer valve surface, and sealing lands extending circumferentially around the longitudinal axis. The mixer assembly further includes a spool valve electrical actuator coupled with the spool valve to move the spool valve in axial directions between an open position and a closed position relative to the gas inlet locations. The sealing lands are in an alternating arrangement with the gas distribution openings, relative to the longitudinal axis, and have an axial distribution matched to the axial distribution of the gas inlet locations, such that at the closed position the sealing lands block the gas distribution openings from the gas delivery openings, and at the open position the gas distribution openings are fluidly connected to the gas delivery openings.

In another aspect, an engine system includes an intake conduit structured to fluidly connect to a cylinder in an engine, and forming a flow path for intake gases extending between an air inlet, and an intake port for feeding the intake gases into the cylinder. The engine system further includes a gaseous fuel mixer assembly having a mixer housing supported in the intake conduit and extending across the flow path. The mixer housing forms a central bore and gas delivery openings opening to the flow path and fluidly connected to the central bore. The mixer housing defines a longitudinal axis, and the gas delivery openings have a circumferential distribution and an axial distribution in the mixer housing. The gaseous fuel mixer assembly further includes a spool valve within the central bore, the spool valve forming a gas supply passage and gas distribution openings fluidly connected to the gas supply passage. The gaseous fuel mixer assembly further includes a spool valve electrical actuator coupled with the spool valve to move the spool valve in axial directions between an open position where the gas distribution openings are fluidly connected to the gas delivery openings, and a closed position where the spool valve blocks the gas distribution openings from the gas delivery openings.

In still another aspect, a method of operating an engine system includes conveying intake air through a flow path in an intake conduit to an intake port fluidly connected to a cylinder in an engine, and energizing a spool valve electrical actuator coupled with a spool valve in a gaseous fuel mixer assembly extending across the flow path in the intake conduit. The method further includes moving the spool valve from a closed position to an open position in a mixer housing of the gaseous fuel mixer assembly, such that a gas supply passage in the spool valve is fluidly connected to gas delivery openings in the mixer housing having a circumferential distribution and an axial distribution relative to a longitudinal axis of the mixer housing. The method still further includes mixing gaseous fuel delivered into the intake conduit by the moving of the spool valve with the intake air to form a combustion charge for combusting in the cylinder and the engine.

BRIEF DESCRIPTION OF THE DRAWINGS

FIG. 3 is an exploded view of portions of a gaseous fuel mixer assembly, according to one embodiment; and FIG. 4 is a sectioned view through a mixer housing in a gaseous fuel mixer assembly, according to one embodiment.

DETAILED DESCRIPTION

Figure 1:
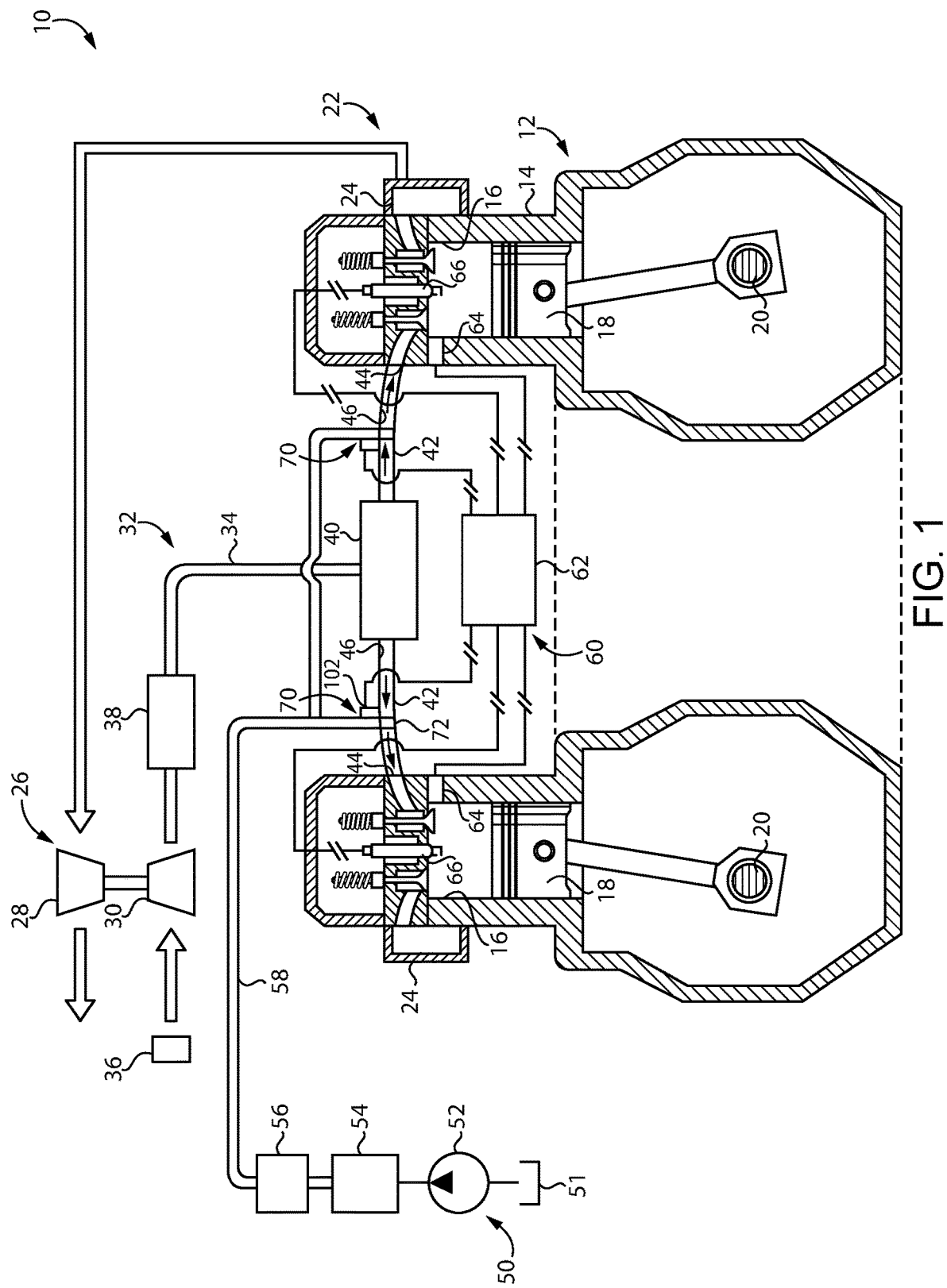
FIG. 1 is a diagrammatic view of an engine system, according to one embodiment.

Referring to FIG. 1, there is shown an internal combustion engine system 10, according to one embodiment. Engine system 10 includes an engine 12 having an engine housing 14 with a plurality of cylinders 16 formed therein. A plurality of pistons 18 are movable, each within one of the plurality of cylinders 16, between a bottom dead center position and a top dead center position, typically in a conventional four-stroke cycle. Engine 12 can include any number of combustion cylinders in any suitable arrangement, such as a V-pattern, an inline pattern, or still another. Pistons 18 are coupled with a crankshaft 20 in a generally conventional manner, and operate to rotate crankshaft 20 to provide torque for propelling a vehicle, driving an external load such as an electrical generator, a pump, a compressor, or still another.

Engine system 10 further includes an exhaust system 22 having an exhaust manifold 24 structured to feed exhaust from cylinders 16 to a turbine 28 in a turbocharger 26. Rotation of turbine 28 in response to a flow of the exhaust gases rotates a compressor 30 in turbocharger 26 to compress intake air for feeding to cylinders 16, also in a generally conventional manner. Engine system 10 also includes an intake system 32 having an intake conduit 34 extending from an air inlet 36 to an intake manifold 40, and from intake manifold 40 to intake ports 44 in engine housing 14, by way of intake runners 42. Intake runners 42 are understood herein as parts of intake conduit 34. Intake runners 42, and intake conduit 34, form an intake flow passage or path 46 for incoming intake gases including intake air compressed by way of compressor 30 and cooled by way of an aftercooler 38, and potentially other gases such as recirculated exhaust gas.

Engine system 10 also includes a fuel system 50 structured to deliver a gaseous fuel to cylinders 16. A gaseous fuel according to the present disclosure includes fuels having a gaseous state at standard temperature and pressure, including natural gas, methane, ethane, biogas, landfill gas, or still others. A gaseous fuel according to the present disclosure could also include premixed gasoline or petroleum gas, blends of any of the listed fuels, or still others. In the illustrated embodiment fuel system 50 includes a pump 52 structured to pump a gaseous fuel in a liquid state from a tank 51, such as a cryogenically stored liquified state, to a vaporizer 54 for converting to a gaseous form. From vaporizer 54 the now-vaporized gaseous fuel can be pressurized in a compressor 56 and fed by way of a gas line 58 to intake conduit 34. Also in the illustrated embodiment gaseous fuel is fed by way of gas line 58 to each of the intake runners 42 in intake system 32. It should be appreciated that gaseous fuel could be supplied to other locations, such as directly to intake manifold 40 or to a location upstream thereof. In a practical implementation strategy gaseous fuel is delivered into intake runners 42 at a location that is downstream of intake manifold 40 and upstream of the respective intake ports 44.

Fuel system 50 also includes a plurality of identical or interchangeable gaseous fuel mixer assemblies 70 each coupled with a respective one of intake runners 42 and receiving a flow of gaseous fuel from gas line 58. Each gaseous fuel mixer assembly 70, hereinafter referred to in the singular, includes a mixer housing 72 supported in intake conduit 34 and extending across flow path 46, and a spool valve electrical actuator 102 structured to actuate internal components of gaseous fuel mixer assembly 70. As will be further apparent from the following description, gaseous fuel mixer assembly 70 advantageously provides reduced risk of gas leakage in response to boost pressure fluctuations, improved efficiency in mixing, and greater precision and accuracy in control of delivering gaseous fuel to cylinders 16, in contrast to certain known techniques.

Engine system 10 further includes a control system 60 having an electronic control unit 62. Electronic control unit or engine control unit 62 can include any suitable central processing unit, including a microprocessor or a microcontroller, for example, and receives data from various sources to control the opening and closing of gaseous fuel mixer assembly 70 to deliver gaseous fuel. In the illustrated embodiment a pressure sensor 64 is associated with each cylinder 16, and produces cylinder pressure data that is received by electronic control unit 62 and serves as a basis for turn-on time and/or duration of electrical actuators 102 to balance engine power amongst cylinders 16. For example, where cylinder pressure in one cylinder 16 is observed to be too high as compared to another cylinder 16, electronic control unit 62 can reduce an open time of the associated gaseous fuel mixer assembly to reduce the fueling level or rate and thus reduce the difference in cylinder pressure between the respective cylinders. Electronic control unit 62 thus serves as a power supply for electrical actuators 102. Electronic control unit 62 is also coupled with sparkplugs 66 each forming a spark gap within a respective one of cylinders 16. Electronic control unit 62 can energize sparkplugs 66 at a desired ignition timing. In other instances, rather than utilizing spark ignition, engine system 10 could be a dual fuel engine, employing an injection of a charge of a liquid fuel, such as diesel distillate fuel, into each cylinder 16 to compression ignite and thereby ignite a charge of gaseous fuel. In a dual fuel application, liquid fuel could be directly injected using a known type of fuel injector. Still other example embodiments could include other strategies or combinations of spark ignition, liquid fuel pilot ignition, and gaseous fuel delivery.

Figure 2:
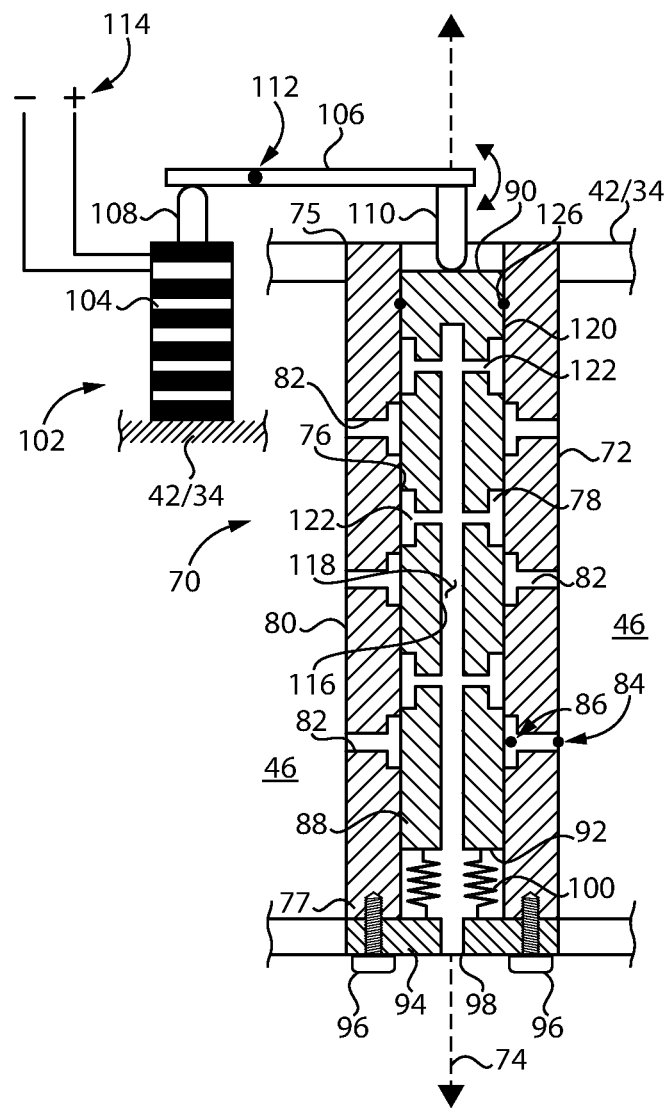
FIG. 2 is a sectioned side diagrammatic view of a gaseous fuel mixer assembly supported in an intake conduit, according to one embodiment.

Referring also now to FIGS. 2 and 3, gaseous fuel mixer assembly 70 includes a mixer housing 72 defining a longitudinal axis 74 extending between a first mixer housing end 75 and a second mixer housing end 77. Mixer housing 72 further includes an inner housing surface 76 forming a central bore 78, an outer housing surface 80, and gas delivery openings 82 fluidly connected to central bore 78 and extending to outer housing surface 80. Mixer housing 72 is supported in intake conduit 42 and extends across flow path 46. In the illustrated embodiment each of first mixer housing end 75 and second mixer housing end 77 contacts and is supported in intake conduit 42, for example, fitted in bores or seats in walls of intake conduit 42 or otherwise fastened in place. In other arrangements a different mounting strategy, or a configuration where mixer housing 72 extends not fully but only partially across flow path 46 might be employed. In a practical implementation, mixer housing 72 extends at least a majority of the way across a full inner diameter of intake conduit 42. Intake conduit 42 may be substantially cylindrical, with mixer housing 72 generally occupying a location spanning a center of a cylindrical flow path 46 formed by intake conduit 42.

Gas delivery openings 82 form gas outlet locations 84 having a circumferential distribution and an axial distribution, relative to longitudinal axis 74, in outer housing surface 80. Gas delivery openings 82 also form gas inlet locations 86 having an axial distribution, relative to longitudinal axis 74, in inner housing surface 76. Mixer assembly 70 further includes a spool valve 88 within central bore 78, and including an inner valve surface 116 forming a gas supply passage 118, an outer valve surface 120, and gas distribution openings 122 fluidly connected to gas supply passage 118 and extending to outer valve surface 120. Sealing lands 124 extend circumferentially around longitudinal axis 74. An O-ring seal 126 is fitted upon spool valve 88 and forms a fluid seal, which can include a sliding fluid seal, between outer valve surface 120 and inner housing surface 76. Spool valve 88 further includes a first axial end surface 90 and a second axial end surface 92. Mixer assembly 70 further includes a biaser 100 held captive between second axial end surface 92 and mixer housing 72. In the illustrated embodiment mixer housing 72 includes an end plate 94 and fasteners 96 fastening end plate 94 to a main or base piece of mixer housing 72. Fasteners 96 may include bolts, screws, or the like. A fuel supply port or inlet 98 is formed in mixer housing 72, and in the illustrated embodiment is generally centrally located in end plate 94 to feed gaseous fuel to an open end of gas supply passage 88. Supply port 98 can be fluidly connected to gas line 58 to supply gaseous fuel into central bore 78 and/or into gas supply passage 118 of spool valve 88 for distribution as further discussed herein. Biaser 100 can include one or more biasing springs held in compression between end plate 94 and spool valve 88.

Mixer assembly 70 further includes a spool valve electrical actuator 102 coupled with spool valve 88, such as coupled with first axial end surface 90, and structured to move spool valve 88 in axial directions between an open position and a closed position relative to gas inlet locations 86 in cooperation with biaser 100. Sealing lands 124 can include cylindrical surfaces that interact with cylindrical surfaces of mixer housing 72 to form fluid seals blocking fluid connection between gas distribution openings 122 and gas delivery openings 82 at the closed position of spool valve 88, but do not block the fluid connection at the open position of spool valve 88. Sealing lands 124 are in an alternating arrangement with gas distribution openings 122, and have an axial distribution matched to the axial distribution of gas inlet locations 86, such that at the closed position of spool valve 88 sealing lands 124 block gas distribution openings 122 from gas delivery openings 82, and at the open position of spool valve 88 gas distribution openings 122 are fluidly connected to gas delivery openings 82. Matching of the axial distributions means that sealing lands 124 align with and overlap each of the gas inlet locations, at the closed position, although the axial length of each sealing land 124 will generally be greater than an axial length of gas delivery openings 82 in inner housing surface 76 and the axial lengths of sealing lands 124 might not be uniform. At least one of gas distribution openings 122 or gas delivery openings 82 include grooves in the respective inner housing surface 76 and outer valve surface 120. In the illustrated embodiment, each of gas distribution openings 122 and gas delivery openings 82 include grooves 128 and 130, respectively, that are circumferential of longitudinal axis 74, and which may be fully circumferential of longitudinal axis 74.

Referring also now to FIG. 4, there is shown a sectioned view, in an axial section plane, through mixer assembly 70 illustrating an elongated and profiled shape of mixer housing 72. Outer housing surface 80 may be understood as profiled to form an oval shape, in an axial section plane. When positioned for service in intake conduit 42 mixer assembly 70 can be oriented so as to obstruct a flow of intake gases as little as practicable based upon the shape and orientation of mixer housing 72. Mixer housing 72 has a major diameter (x) and a minor diameter (y) in an axial section plane, such that an aspect ratio of mixer housing 72 is x:y, where x=1 and y<1. In a refinement, the aspect ratio of mixer housing 72 is x:y, where x=1 and y≤0.25. The elongate, flattened shape, in profile, provided by mixer housing 72 can obstruct the flow of intake gases through intake conduit 42 only minimally, with major diameter (x) oriented parallel to a flow direction defined by flow path 46.

Additional details as to the locations and distribution of gas delivery openings 82 can also be seen in FIG. 4. It can be noted gas delivery openings 82 extend generally in a fore-and-aft direction toward narrowed ends of mixer housing 72. The oval shape formed by outer surface 82 can be understood to form opposite end curves 132, in an axial section plane, with major diameter (x) intersecting each of opposite end curves 132 at the gas outlet locations 84, and gas delivery openings 82 being intersected by end curves 132, or having end curves 132 tangent to gas delivery openings 82. Lateral sides of the oval shape formed by outer housing surface 80 can be smoothly curved and free of any gas delivery locations. It will thus be appreciated that gaseous fuel is delivered into intake gases at an upstream side of mixer assembly 70, and into intake gases at a downstream side of mixer assembly 70. In the illustrated embodiment three gas delivery openings 82 are formed on the upstream side of mixer assembly 70 (the left side in FIG. 4), and three gas delivery openings 82 are formed on the downstream side of mixer assembly 70. In other arrangements, gas delivery openings could differ in relative number between an upstream side and a downstream side of a mixer assembly, be formed in lateral sides of the mixer assembly, or have still another arrangement. In still further embodiments, multiple gaseous fuel mixer assemblies could be positioned fluidly in parallel or fluidly in series in an intake conduit for an engine.

As noted above, spool valve electrical actuator 102 is coupled with spool valve 88 and may be coupled in particular with first axial end surface 90. In the illustrated embodiment spool valve electrical actuator 102 includes a piezoelectric actuator stack 104. Spool valve electrical actuator 102 further includes a pivot arm 106, a first pusher 108 coupled between pivot arm 106 and piezoelectric actuator stack 104, and a second pusher 110 coupled between pivot arm 106 and spool valve 88. Piezoelectric actuator stack 104 may be supported by contact with intake conduit 42, or contact between a housing for piezoelectric actuator stack 104 and intake conduit 42, or supported in still another manner. First pusher 108 and second pusher 110 may each include pins or the like that are in contact with piezoelectric actuator stack 102 and pivot arm 106, and with first axial end surface 90 and pivot arm 106, respectively. Also in the illustrated embodiment, pivot arm 106 includes a lever arm that is pivotable about a pivot point 112. Pivot point 112 could be defined by an axle supported at a fixed location upon or in walls of intake conduit 42 or in a separate supporting frame attached to intake conduit 42. Pivot point 112 may be closer to first pusher and a corresponding end of pivot arm 106 than to second pusher 110 and the corresponding end of pivot arm 106, such that a displacement of spool valve 88 is amplified relative to a displacement of piezoelectric actuator stack 104 responsive to energizing of piezoelectric actuator stack 104. A power supply 114 for piezoelectric actuator stack 104 is shown in FIG. 2. Power supply 114 could be, or be part of or connected to, electronic control unit 62.

INDUSTRIAL APPLICABILITY

As explained above, mixer assembly 70 is structured to mix a gaseous fuel such as natural gas into intake gases, including principally intake air, for an engine. Providing for installation in an intake runner, in or just adjacent to an intake port, or even elsewhere in an intake system, while employing multiple gas distribution openings, is contemplated to advantageously utilize intake gas flow momentum to mix intake air and gaseous fuel before entering a cylinder for combustion. It will typically be desirable for a mixer assembly according to the present disclosure to be as narrow widthwise as practicable to minimize obstruction to an intake flow area.

Engine system 10 can be operated by conveying intake air through flow path 46 in intake conduit 42 to intake port 44 which fluidly connects to cylinder 16 in engine 12. When it is desirable to deliver gaseous fuel into flow path 46, such as prior to and/or during an intake stroke of piston 18, spool valve electrical actuator 102 can be energized to move spool valve 88 from the closed position to the open position in mixer housing 72. Moving the spool valve 88 to the open position causes gas supply passage 118 in spool valve 88 to be fluidly connected to gas delivery openings 82. Gaseous fuel will be delivered at a supply pressure sufficient to enable a flow of the gaseous fuel to advance from gas distribution openings 122 into gas delivery openings 82 and thenceforth into flow path 46.

Delivery of gaseous fuel in this manner enables mixing of the gaseous fuel delivered into intake conduit 42 with air to form a combustion charge for combusting in cylinder 16 in engine 12. Since spool valve electrical actuator 102 can be relatively rapidly turned on and turned off and move spool valve 88 between the open position and the closed position quite rapidly, as compared to typical solenoid-operated designs, the present disclosure enables flow of gaseous fuel into intake conduit 42 to be rapidly and precisely initiated as well as rapidly and precisely terminated. Moreover, employing a valve configuration in mixer assembly 70 that uses a slide-type spool valve prevents any arrangement where boost pressure fluctuations could be expected to cause mixer assembly 70 to be pushed open and air pushed into gas line 58, or otherwise displacing or disrupting operation of gaseous fuel control in a way that causes a risk of leakage or other problems.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A gaseous fuel mixer assembly for an engine comprising: a mixer housing defining a longitudinal axis and including an inner housing surface forming a central bore, an outer housing surface, and gas delivery openings fluidly connected to the central bore and extending to the outer housing surface; the gas delivery openings form gas outlet locations having a circumferential distribution and an axial distribution in the outer housing surface, and gas inlet locations having an axial distribution in the inner housing surface; a spool valve within the central bore and including an inner valve surface forming a gas supply passage, an outer valve surface, gas distribution openings fluidly connected to the gas supply passage and extending to the outer valve surface, and sealing lands extending circumferentially around the longitudinal axis; a spool valve electrical actuator coupled with the spool valve to move the spool valve in axial directions between an open position and a closed position relative to the gas inlet locations; and the sealing lands are in an alternating arrangement with the gas distribution openings, relative to the longitudinal axis, and have an axial distribution matched to the axial distribution of the gas inlet locations, such that at the closed position the sealing lands block the gas distribution openings from the gas delivery openings, and at the open position the gas distribution openings are fluidly connected to the gas delivery openings; an intake structured to fluidly connect to a cylinder in an engine, and forming a flow path for intake gases extending between an air inlet and an intake port for feeding the intake gases into the cylinder, the mixer housing supported in the intake conduit and extending across the flow path.

2. The mixer assembly of claim 1 wherein the spool valve electrical actuator includes a piezoelectric actuator stack.

3. The mixer assembly of claim 2 wherein the spool valve electrical actuator further includes a pivot arm, a first pusher coupled between the pivot arm and the piezoelectric actuator stack, and a second pusher coupled between the pivot arm and the spool valve.

4. The mixer assembly of claim 3 wherein the pivot arm is a lever arm pivotable about a pivot point closer to the first pusher than to the second pusher, such that a displacement of the spool valve is amplified relative to a displacement of the piezoelectric actuator stack responsive to energizing of the piezoelectric actuator stack.

5. The mixer assembly of claim 1 wherein the mixer housing has a major diameter (x) and a minor diameter (y), in an axial section plane, such that an aspect ratio of the mixer housing is x:y, where x=1 and y<1.

6. The mixer assembly of claim 5 wherein the aspect ratio of the mixer housing is x:y, where x=1 and y≤0.25.

7. The mixer assembly of claim 5 wherein the outer housing surface is profiled to form an oval shape, in an axial section plane.

8. The mixer assembly of claim 7 wherein the oval shape forms opposite end curves, in an axial section plane, and the major diameter intersects each of the opposite end curves at the gas outlet locations.

9. The mixer assembly of claim 1 wherein at least one of the gas distribution openings or the gas delivery openings include grooves in the respective inner housing surface and outer valve surface.

10. The mixer assembly of claim 9 wherein each of the gas distribution openings and the gas delivery openings include grooves in the respective inner housing surface and outer valve surface that are fully circumferential of the longitudinal axis.

11. The mixer assembly of claim 1 wherein:
the spool valve includes a first axial end surface and a second axial end surface;
the spool valve electrical actuator is coupled with the first axial end surface; and
the mixer assembly further includes a biaser held captive between the second axial end surface and the mixer housing.

12. An engine system comprising: an intake conduit structured to fluidly connect to a cylinder in an engine, and forming a flow path for intake gases extending between an air inlet, and an intake port for feeding the intake gases into the cylinder; a gaseous fuel mixer assembly including a mixer housing supported in the intake conduit and extending across the flow path, the mixer housing forming a central bore and gas delivery openings opening to the flow path and fluidly connected to the central bore; the mixer housing defining a longitudinal axis, and the gas delivery openings having a circumferential distribution and an axial distribution in the mixer housing; the gaseous fuel mixer assembly further including a spool valve within the central bore, the spool valve forming a gas supply passage and gas distribution openings fluidly connected to the gas supply passage; and the gaseous fuel mixer assembly further including a spool valve electrical actuator coupled with the spool valve to move the spool valve in axial directions between an open position where the gas distribution openings are fluidly connected to the gas delivery openings, and a closed position where the spool valve blocks the gas distribution openings from the gas delivery openings; sealing lands extending circumferentially around the longitudinal axis of the mixer housing; the sealing lands are in an alternating arrangement with the gas distribution openings, relative to the longitudinal axis, and have an axial distribution matched to the axial distribution of the as inlet locations, such that at the closed position the sealing lands block the gas distribution openings from the gas delivery openings, and at the open position the gas distribution openings are fluidly connected to the gas delivery openings.

13. The engine system of claim 12 wherein the mixer housing extends fully across the flow path and is supported at opposite mixer housing ends in contact with the intake conduit.

14. The engine system of claim 12 wherein the spool valve electrical actuator includes a pivot arm coupled with the spool valve.

15. The engine system of claim 14 wherein the spool valve electrical actuator further includes a piezoelectric actuator stack, and the pivot arm is coupled with the piezoelectric actuator stack and pivots about a pivot point between the piezoelectric actuator stack and the spool valve.

16. The engine system of claim 12 wherein:
the mixer housing includes an outer housing surface profiled to form an oval shape, in an axial section plane, having a major diameter oriented parallel to a flow direction of the flow path; and
the oval shape forms opposite end curves, and the gas delivery openings are intersected by the opposite end curves.

17. The engine system of claim 12 wherein the gas distribution openings include grooves that are circumferential of the longitudinal axis.

18. A method of operating an engine system comprising: conveying intake air through a flow path in an intake conduit to an intake port fluidly connected to a cylinder in an engine; energizing a spool valve electrical actuator coupled with a spool valve in a gaseous fuel mixer assembly extending across the flow path in the intake conduit; moving the spool valve from a closed position to an open position in a mixer housing of the gaseous fuel mixer assembly, such that a gas supply passage in the spool valve is fluidly connected to gas delivery openings in the mixer housing having a circumferential distribution and an axial distribution relative to a longitudinal axis of the mixer housing, sealing lands extending circumferentially around the longitudinal axis of the mixer housing; the sealing lands are in an alternating arrangement with the gas distribution openings, relative to the longitudinal axis, and have an axial distribution matched to the axial distribution of the gas inlet locations, such that at the closed position the sealing lands block the gas distribution openings from the gas delivery openings, and at the open position the gas distribution openings are fluidly connected to the gas delivery openings; and mixing gaseous fuel delivered into the intake conduit by the moving of the spool valve with the intake air to form a combustion charge for combusting in the cylinder in the engine.

19. The method of claim 18 wherein the conveying of intake air includes conveying the intake air around an outer housing surface of the mixer housing forming an oval shape having a major diameter oriented parallel to a flow of the intake air.

20. The method of claim 18 wherein the energizing of the spool valve electrical actuator includes energizing a piezoelectric actuator stack coupled with the spool valve by way of a pivot arm.

* * * * *